United States Patent [19]

Yeardley

[11] Patent Number: 5,072,667
[45] Date of Patent: Dec. 17, 1991

[54] MEANS AND METHOD FOR BALING STRAW, HAY AND LIKE MATERIAL

[75] Inventor: John K. Yeardley, London, England

[73] Assignee: Bridon PLC, Doncaster, England

[21] Appl. No.: 605,006

[22] Filed: Oct. 30, 1990

Related U.S. Application Data

[63] Continuation of Ser. No. 470,411, Jan. 29, 1990, abandoned, which is a continuation of Ser. No. 365,120, Jun. 12, 1989, abandoned, which is a continuation of Ser. No. 227,668, Aug. 2, 1988, abandoned.

[51] Int. Cl.$^5$ .............................................. B65B 13/02
[52] U.S. Cl. .......................................... 100/3; 56/341; 100/5; 100/88; 100/89; 242/166
[58] Field of Search ...................................... 100/1-5, 100/8, 13, 15, 40, 78, 87, 88, 89, 918; 56/341-344; 242/129.5, 129.6, 130, 134, 141, 159, 166, 174, 176, 178

[56] References Cited

U.S. PATENT DOCUMENTS

| 592,592 | 10/1897 | Morse | 242/166 |
|---|---|---|---|
| 2,324,584 | 7/1943 | Karns | 242/166 |
| 2,971,455 | 2/1961 | Wade et al. | 100/5 |
| 3,301,506 | 1/1967 | Bagby | 242/166 |
| 4,151,793 | 5/1979 | Oosterling et al. | 100/3 X |
| 4,205,513 | 6/1980 | Shokoples | 100/5 X |
| 4,467,712 | 8/1984 | Fincham | 100/3 X |
| 4,557,189 | 12/1985 | Schaible | 100/4 |
| 4,566,378 | 1/1986 | Fleissner | 100/3 X |

FOREIGN PATENT DOCUMENTS

| 972098 | 5/1959 | Fed. Rep. of Germany | 100/13 |
|---|---|---|---|
| 2831315 | 2/1980 | Fed. Rep. of Germany | 100/5 |
| 7603 | of 1891 | United Kingdom | 100/4 |
| 619038 | 3/1949 | United Kingdom | 242/166 |

Primary Examiner—Harvey C. Hornsby
Assistant Examiner—Stephen F. Gerrity
Attorney, Agent, or Firm—Brady, O'Boyle & Gates

[57] ABSTRACT

A method of baling straw, hay and like materials by feeding wrapping material around a cylindrical bale to hold the bale together is provided, in which method the wrapping material comprises a plurality of ends of twine which are fed simultaneously around the bale at positions spaced apart axially along the bale. The wrapping material comprises a baler twine package comprising a plurality of spooled ends of twine mounted co-axially and side-by-side on a common carrier, whereby in use the ends can be withdrawn simultaneously from positions spaced apart along the carrier to wrap a bale.

5 Claims, 2 Drawing Sheets

MEANS AND METHOD FOR BALING STRAW, HAY AND LIKE MATERIAL

This is a continuation of Ser. No. 470,411 filed Jan. 29, 1990, (abandoned) which is a continuation of Ser. No. 365,120 filed June 12, 1989, (abandoned) which is a continuation of Ser. No. 227,668 filed Aug. 2, 1988, (abandoned).

This invention is concerned with a means and method for baling straw, hay and like materials.

For many years, baling machines have been used to produce rectangular bales which have been secured by twine disposed round them and thereafter knotted to prevent removal. More recently, baling machines were introduced which produce round (i.e. generally cylindrical) bales which have been secured by wrapping a single length of twine round them, and more recently still it was found that if a sufficient number of turns was used then the bale was secure without any need to knot the twine.

In these latter embodiments the baling machine (baler) collects the straw or other material and rolls it into a bale. When sufficient material has been collected, so that the bale is of the desired size, the baler must then pause while twine is applied to the bale. The time taken to apply the twine, and thus to secure the bale, may be substantial. In order to reduce this time some balers have been produced which use a net instead of twine to secure round bales. The net requires fewer laps round the bales, with consequent time saving, but the cost of the net is considerably more than that of twine.

The present invention seeks to provide a means and method which enable bales to be secured quickly and cheaply by twine—thus, with the cost-saving benefits of twine and with at least some of the time-saving benefits of netting. To attain this end it proposed a baler twine package comprising a plurality of spools of twine mounted co-axially and side-by-side on a common carrier, whereby the free twine ends can be withdrawn simultaneously from positions spaced apart along the carrier to wrap a bale. It also proposes a method of securing a cylindrical bale by feeding around the bale, to hold it together, a plurality of ends of twine, the ends being fed simultaneously around the bale at positions spaced apart axially therealong.

Accordingly, in a first aspect the invention provides a baler twine package comprising a plurality of spooled ends of twine mounted co-axially and side-by-side on a common carrier, whereby in use the ends can be withdrawn simultaneously from positions spaced apart along the carrier to wrap a bale.

The twine package can be made with overall dimensions similar to those of a roll of netting, so that it can be fitted into the netting housing on a baler and used instead of netting. Typically the package will be around 4 ft (1.2 m long) and 6 ins (15 cm) in diameter.

The number of ends of twine may be varied depending on the size of the bales. However, preferably there are at least 4 ends (otherwise the bale may not be properly secured), but not more than 10 ends (otherwise each spool will be too short; it is desirable for the spools to carry around 1.25 miles [2 Km] of twine). Typically, there will be 6 or 8 ends, or one end per 6-8 in (15-20 cm).

It has been found that only three or four wraps of each end round the bale is necessary to make the bale secure without knotting (the ends of course being wrapped simultaneously), compared with either a conventional twine system which requires twelve to fourteen wraps or a net system which requires two to three wraps.

In one form of the invention, each end is wound on to its own hollow core, and the carrier comprises a spindle passing through the hollow cores. The hollow cores may be flanged (as in a cotton reel, for instance) or unflanged (simple tubular bobbins). They may be fixed to the spindle or (preferably) may be rotatable thereon. In any event, if on unflanged cores the spooled ends should desirably be mounted in tight side-by-side engagement (with the cores possibly glued together) to minimise the risk of the twine, during withdrawal, entering between the spools and becoming jammed.

In another arrangement, however, the ends may be wound directly on to the common carrier. In that case, to minimise the risk of the jamming of twine as mentioned above, the ends should either be wound in close engagement side-by-side, or—and preferably—the windings of adjoining ends of twine should overlap one another, layer by layer.

The twine used in the present invention may be any suitable such twine. That commonly used in the Art is the so-called "Raffia grade", comprising twisted and partly fibrillated polypropylene film about 2 mm in diameter. However, the twine may be in the form of flat polypropylene tape, which may become partly fibrillated in spooling and in use. Of course, other synthetic or natural materials may be used for the twine; for example, the twine may be a biodegradeable synthetic material.

In its second aspect the invention provides a method of baling straw, hay and like materials which includes feeding wrapping material around a cylindrical bale to hold the bale together, in which method the wrapping material comprises a plurality of ends of twine which are fed simultaneously around the bale at positions spaced apart axially along the bale.

The following is a description, by way of example, of an embodiment of the invention, reference being made to the accompanying schematic drawings in which FIG. 1 shows a general view of a baler of the type with which the invention is concerned;

Figure 1:
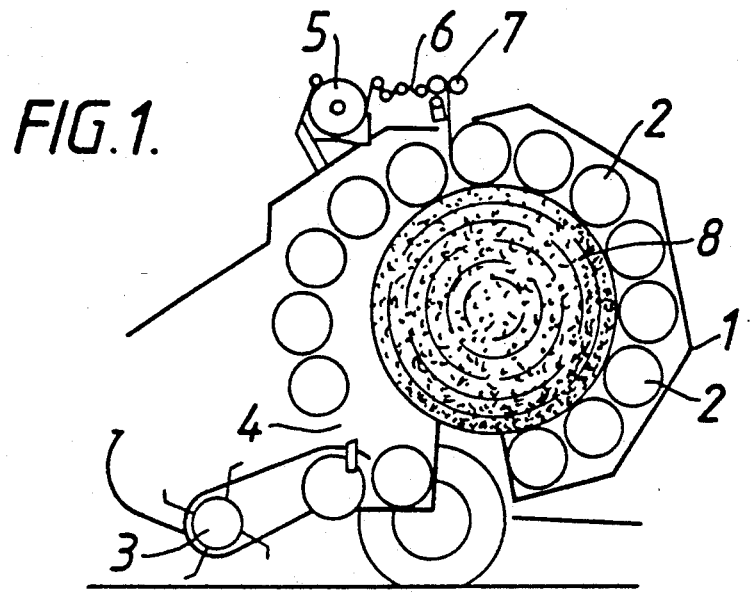

The baler of FIG. 1 is a power-driven wheel-mounted device having an outer cylindrical casing (1) within which are peripherally mounted a series of driven "rollers" (as 2) that "wind up" straw fed in by a tined roller (3) via opening (4).

Mounted atop the casing 1 is a multi-ended roll of twine (5) whose several ends (6) are fed via a series of powered rollers (as 7) into the interior of the casing—and, at the appropriate time, around the formed bale (8).

Figure 2:
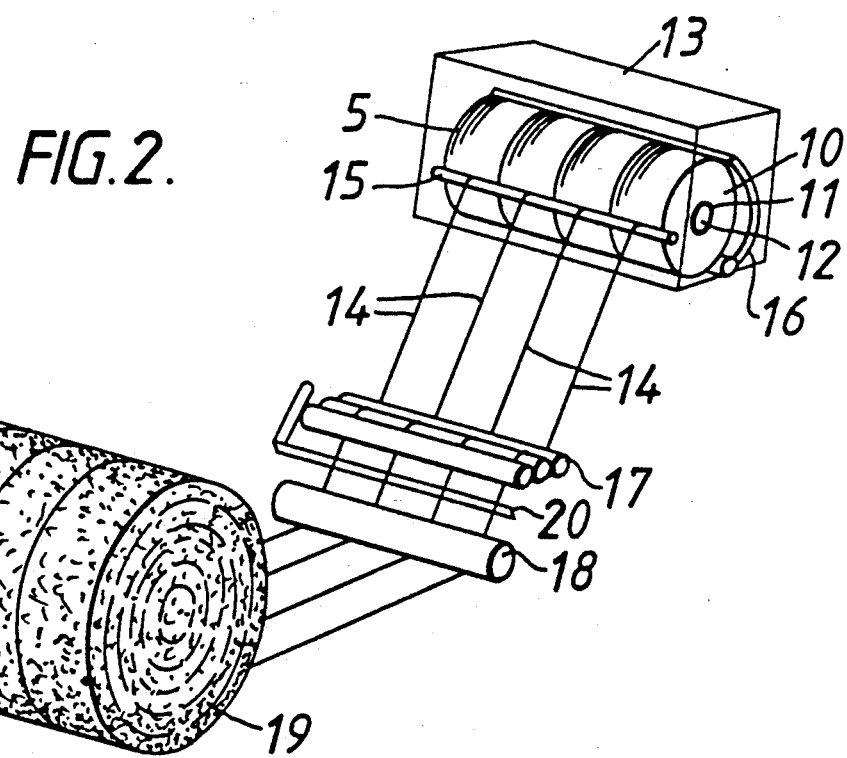
FIG. 2 shows a perspective, and diagrammatic, view of the invention twine package being used to secure a bale.
Figure 5:
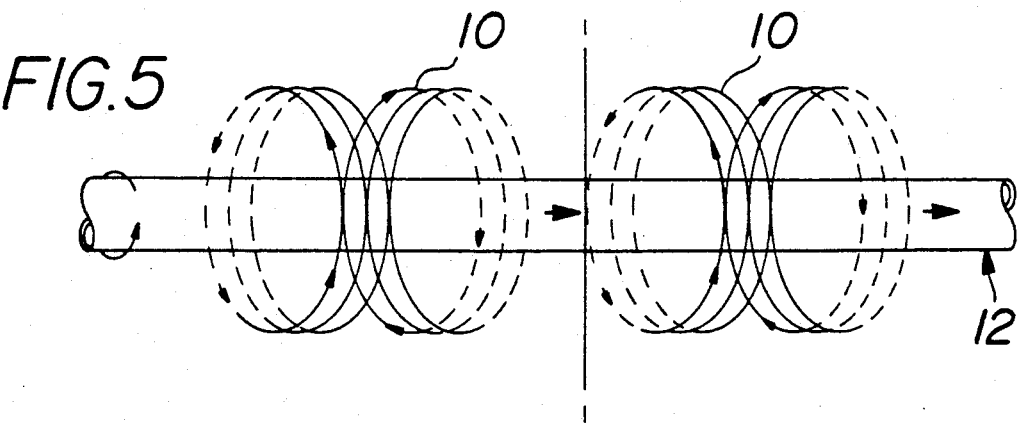
FIG. 5 is a diagrammatic view showing the manner in which the twine of the spools of FIG. 4 is wound on the common carrier.
Figure 4:
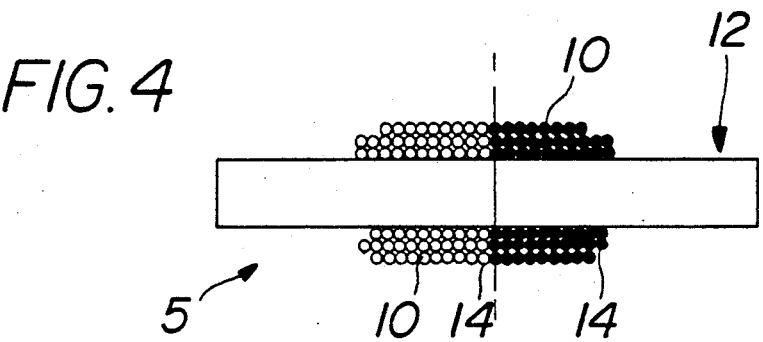
FIG. 4 is a schematic cross-sectional view taken on line 4—4 of FIG. 3 showing a pair of spools of twine wound in close side-by-side engagement on a common carrier.
Figure 7:
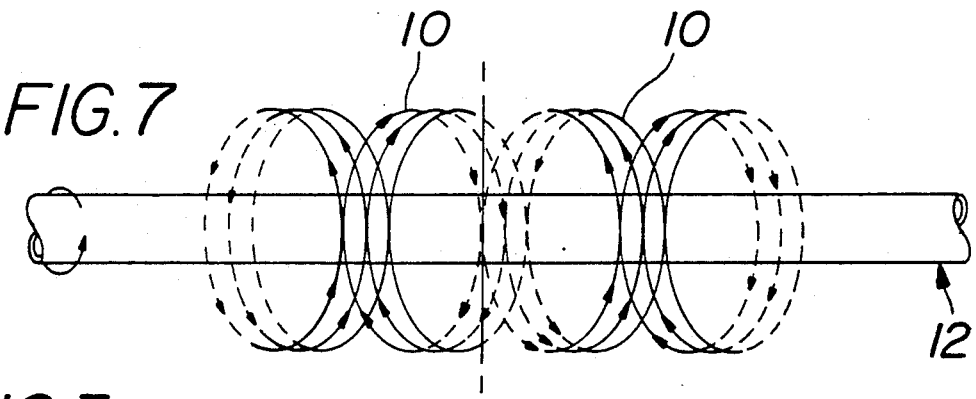
FIG. 7 is a diagrammatic view showing the manner in which the twine of adjoining spool ends in FIG. 6 overlap one another.
Figure 3:
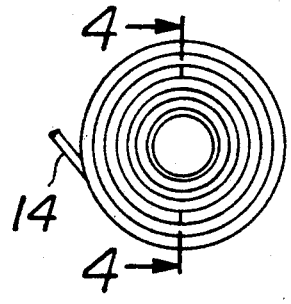
FIG. 3 is an end view of the twine package shown in FIG. 2.
Figure 6:
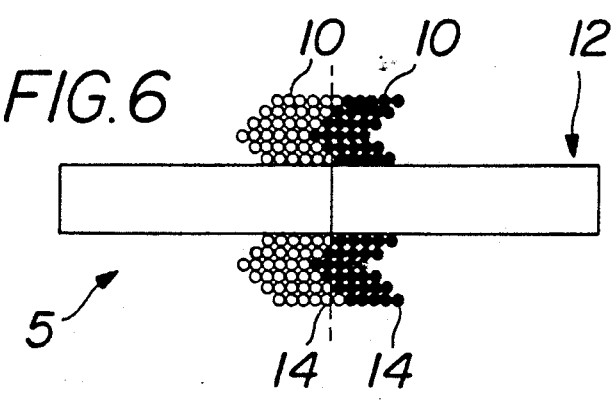
FIG. 6 is a schematic cross-sectional view similar to FIG. 4 but showing the windings of a pair of spools overlapping one another layer by layer.

The details of the invention are more clearly seen in FIG. 2. A baler twine package (5) comprises a plurality of spooled ends (14) of twine. Only four spools (10) are shown in the drawing, but in practice larger numbers (e.g. 6-8) of spools would usually be provided. The twine on each spool 10 is wound in conventional fashion on a hollow core (11), and the cores are slid on to a spindle (12) so that the spools 10 are in close side-by-side engagement. In another arrangement as shown in FIGS. 4-7, the ends of twine are wound directly into spools 10, co-axially in side-by-side engagement, on to the common carrier 12. The adjacent side ends of spools 10 are in contacting relation with each other to minimize the risk of jamming of the twine as previously mentioned. In another embodiment, as shown in FIGS. 6 and 7, the successive windings of adjacent wound lengths of twine in adjacent spools 10 overlap previous windings of the adjacent wound lengths of twine, layer by layer, or winding by winding, to further minimize the risk of jamming of the twine. The package is disposed in a package holder (13) of a baler so that it can rotate thereon about the spindle or common carrier axis, under the control of a package tensioner (16). The ends 14 of twine from the spools 10 pass over a guide bar (15) and then round feed rollers (17) to a spread roller (18). From the roller 18 the twine passes to the rotating bale (19; 8 in FIG. 1), around which the ends are wound under tension. When the ends have been wrapped round the bale for the desired number of wraps, a cutter (20) severs the ends.

The baler is of commercially available form. However, as explained above, the present invention provides a novel form of wrapping package which can be used in such a baler with substantial advantages.

I claim:

1. Apparatus for supplying twine in a cylindrical bale baling machine, comprising a baler twine package having a common carrier, said common carrier having a plurality of separate lengths of twine wound into adjacent spools of twine co-axially thereon in close side-by-side engagement, the sides of adjacent wound lengths of twine being in contacting engagement with each other, support means on said baling machine arranged to receive and support said baler twine package for axial rotation, means on said baling machine for rotating a cylindrical bale on an axis parallel with said common carrier, means for always simultaneously withdrawing twine from all of said spools of said baler twine package to rotate the baler twine package as a unit, and means for applying said twine simultaneously from all of said spools around a rotating cylindrical bale at positions spaced axially along the bale to wrap a cylindrical bale, whereby replacement of said baler twine package on said support means simultaneously replaces all of said spools of twine in the baling machine.

2. A method of securing a cylindrical bale of straw, and hay like material comprising the steps of, inserting a baler twine package onto a support means for axial rotation, wherein said baler twine package includes a plurality of separate lengths of twine wound into separate spools co-axially on a common carrier, said wound lengths of twine being in close side-by-side engagement with the sides of adjacent wound lengths of twine being in contacting relation; rotating the cylindrical bale of material axially; always withdrawing the ends of twine in the same amount simultaneously from each of said spools on the common carrier at positions spaced axially apart along the baler twine package to rotate the baler twine package as a unit simultaneously with and in parallel relation with the rotating bale; and always simultaneously wrapping said twine from said plurality of spools on the rotating baler twine package around a cylindrical bale at corresponding positions spaced axially apart along said bale while simultaneously rotating the cylindrical bale to hold the bale together.

3. A baler twine package for a baling machine, comprising a common carrier having substantially the same diameter from end to end, a plurality of separate lengths of twine wound into spools directly onto and co-axially in side-by-side relation on said common carrier, the sides of adjacent wound lengths of twine being in contacting relation with each other and successive windings of adjacent wound lengths of twine overlap previous windings of said adjacent wound lengths of twine, each separate wound length of twine having an end, whereby the baler twine package provides a plurality of ends of twine for withdrawing simultaneously from the respective plurality of separate wound lengths of twine at positions spaced apart along the common carrier to wrap a bale.

4. A baler twine package for a baling machine according to claim 3, wherein the common carrier with the plurality of wound spools of twine is rotatable as a unit.

5. A baler twine package for a baling machine according to claim 3, in which said twine package including said common carrier is around four feet in length.

* * * * *